US012121904B2

(12) United States Patent
Orhan

(10) Patent No.: US 12,121,904 B2
(45) Date of Patent: Oct. 22, 2024

(54) LABORATORY VIBRATORY MILL

(71) Applicant: Retsch Gmbh, Haan (DE)

(72) Inventor: Zilan Orhan, Witten (DE)

(73) Assignee: Retsch GmbH, Haan (DE)

( * ) Notice: Subject to any disclaimer, the term of this patent is extended or adjusted under 35 U.S.C. 154(b) by 284 days.

(21) Appl. No.: 17/639,383

(22) PCT Filed: Sep. 3, 2020

(86) PCT No.: PCT/EP2020/074515
§ 371 (c)(1),
(2) Date: Mar. 1, 2022

(87) PCT Pub. No.: WO2021/043854
PCT Pub. Date: Mar. 11, 2021

(65) Prior Publication Data

US 2022/0347692 A1 Nov. 3, 2022

(30) Foreign Application Priority Data

Sep. 6, 2019 (DE) ..................... 20 2019 104 933.2
Sep. 16, 2019 (DE) ..................... 10 2019 124 894.9
(Continued)

(51) Int. Cl.
*B02C 17/18* (2006.01)
*B02C 17/14* (2006.01)

(52) U.S. Cl.
CPC .......... *B02C 17/1815* (2013.01); *B02C 17/14* (2013.01); *B02C 17/1805* (2013.01)

(58) Field of Classification Search
CPC ................ B02C 17/14; B02C 17/1815; B02C 17/10805; B02C 25/00
See application file for complete search history.

(56) References Cited

U.S. PATENT DOCUMENTS 4,688,727 A * 8/1987 Sijsling .................... B02C 15/16 241/290
2011/0303776 A1* 12/2011 Mahler ................. B02C 17/186 241/38
2015/0129692 A1* 5/2015 Pankratz ................. B02C 17/08 241/170

FOREIGN PATENT DOCUMENTS

EP 2391454 A1 12/2011
EP 2861350 A1 4/2015

OTHER PUBLICATIONS

International Search Report and Written Opinion in PCT/EP2020/074515, Nov. 24, 2020, 6 pages.

* cited by examiner

*Primary Examiner* — Mohammed S. Alawadi
(74) *Attorney, Agent, or Firm* — Andrus Intellectual Property Law, LLP

(57) ABSTRACT

The invention illustrates and describes a laboratory vibratory mill with at least one milling beaker holder which is mounted so as to be capable of oscillating, for at least one milling beaker, and with a temperature control device for controlling the temperature of the milling beaker by feeding in and/or carrying away a liquid or gaseous temperature control medium via at least one temperature control line to the milling beaker holder. According to the invention there is provision that the milling beaker holder has at least one heat transfer element which is connected to the temperature control line, wherein the heat transfer element has at least one medium duct for feeding through the temperature control medium, and wherein the temperature control of a milling beaker which is secured to and/or in the milling beaker holder is carried out by transferring heat between the temperature control medium conducted in the medium duct and the milling beaker via a wall of the heat transfer element.

8 Claims, 8 Drawing Sheets

(30) Foreign Application Priority Data

| | | |
|---|---|---|
| Dec. 11, 2019 | (DE) ..................... | 10 2019 133 975.8 |
| Jan. 23, 2020 | (DE) ..................... | 10 2020 101 523.2 |

LABORATORY VIBRATORY MILL

CROSS-REFERENCE TO RELATED APPLICATIONS

This application is the U.S. national stage application of International Application No. PCT/EP2020/074515, filed Sep. 3, 2020, which International Application was published on Mar. 11, 2021, as International Publication WO 2021/043854 A1 in the German language. The International Application claims priority to German Application No. 20 2019 104 933.2, filed Sep. 6, 2019, German Application No. 10 2019 124 894.9, filed Sep. 16, 2019, and German Application No. 10 2019 133 975.8, filed Dec. 11, 2019. The International Application and German Applications are hereby incorporated herein by reference, in their entireties.

FIELD

The invention relates to a laboratory vibrating mill with at least one vibratingly mounted grinding bowl holder for at least one grinding bowl and with a temperature control device for temperature control, i.e. cooling and/or heating, of the grinding bowl by supplying and/or discharging a liquid or gaseous temperature control medium via at least one temperature control line to or from the grinding bowl holder.

BACKGROUND

In vibrating mills for laboratory use, it is known to cause additional brittleness of the material to be comminuted by cooling with liquid nitrogen for efficient comminution of brittle materials in particular. In known processes, cooling is carried out, for example, by immersing the grinding bowl in liquid nitrogen with which a grinding bowl holder is flooded. For this purpose, the liquid nitrogen must be continuously fed to and away from the grinding bowl holder. In this context, it is known to supply the liquid or gaseous medium, for example nitrogen, by means of appropriately arranged flexible hoses. In this case, the hoses are attached directly to the grinding bowl holder, whereby there is then a fluidic connection between the grinding bowl holder and the inserted grinding bowl.

Besides the nitrogen application, other applications use the short-term local release of larger amounts of energy during the grinding process to initiate chemical reactions. Depending on the reactions that occur, the grinding bowl may need to be cooled or heated. This also requires its continuous supply with a medium to temper the reaction chamber.

A laboratory mill with rotary feedthroughs for the grinding bowls to be supplied with a medium is known from EP 2 391 454 B1. In this case, it is provided that two temperature control lines for supplying and discharging the medium are connected to each grinding bowl and both temperature control lines are routed via the rotary feedthrough, whereby two external connections for the stationary temperature control lines of the laboratory mill are formed on the stationary part of the rotary feedthrough and two internal connections for the temperature control lines leading to the grinding bowl are formed on the movable part of the rotary feedthrough.

According to the laboratory mill known from EP 2 391 454 B1, liquid nitrogen is fed into the rotating union via a nitrogen line and a switching valve as well as via a connection and leaves the rotating union via a supply line connected to the connection. The nitrogen flow is then led to the grinding bowl holder and from there back to the moving part of the rotating union and finally reaches a collecting vessel via the stationary part of the rotating union and a return line connected to it. As soon as a sensor located on the collecting vessel comes into contact with liquid nitrogen, the switching valve is closed. After so much nitrogen has evaporated that the sensor is no longer wetted with nitrogen, the switching valve is opened again. This ensures the supply of liquid nitrogen at all times during a grinding process.

To cool the known laboratory mill, the grinding bowl holder is flooded with nitrogen and the grinding bowl inside is flushed with liquid nitrogen. Consequently, there is direct contact between the temperature control medium and the grinding bowl. In addition, the grinding bowl is always cooled to the maximum by the flooding in liquid nitrogen

SUMMARY

It is the task of the present invention to provide a laboratory vibrating mill with the features mentioned at the beginning, which permits the temperature control of the grinding bowl or of a sample received in a grinding chamber of the grinding bowl using different temperature control media in a structurally simple manner, whereby direct contact of the grinding bowl with the temperature control medium does not take place during a grinding process. Furthermore, it is the task of the present invention to design the temperature control in such a way that the heat energy dissipated during cooling of the grinding bowl and/or the heat energy supplied during heating of the grinding bowl is adapted to the actual requirement to the greatest possible extent.

The above-mentioned tasks are solved by a laboratory vibrating mill with the features of the independent claim(s). Advantageous embodiments of the invention are the subject of the dependent claims.

According to the invention, the grinding bowl holder has at least one heat transfer element connected to the temperature control line, wherein the heat transfer element has at least one medium channel for conducting the temperature control medium and wherein the temperature control of a grinding bowl held on and/or in the grinding bowl holder is effected by heat transfer between the temperature control medium conducted in the medium channel and the grinding bowl via a wall of the heat transfer element. The invention is based on the basic idea of providing a separate component of the grinding bowl holder and/or, in the simplest case, a section and/or an area of the grinding bowl holder for heat transfer between the temperature control medium and the grinding bowl. This enables a constructive design of the grinding bowl holder in which there is no direct contact or no contact of the grinding bowl with the temperature control medium during the temperature control of the grinding bowl. In addition, media losses into the environment are prevented. The temperature control medium is guided in a medium channel, which is preferably formed in the heat transfer element and is hermetically sealed with respect to the grinding bowl, in particular with respect to the environment. According to the invention, the heat transfer element is flushed with a liquid or gaseous medium for an energy discharge from the grinding bowl or for an energy supply to the grinding bowl.

Furthermore, the guidance of the temperature control medium in the media channel opens up the possibility of using different gaseous or liquid temperature control media for temperature control of the grinding bowl. The cooling media can be, for example, water, thermal oils or liquid nitrogen. Liquid helium can also be used as a cooling medium. The cooling concept according to the invention can be realized with any liquid or gaseous cooling media.

By changing the volume flow rate of the temperature control medium guided in the media channel and/or the temperature of the temperature control medium, the amount of energy supplied or dissipated during temperature control can be easily adapted to the actual demand of the sample.

The temperature control line is connected to a temperature control device, which is designed to provide a temperature control medium, which may be cooled or heated, and to forward the temperature control medium to a grinding bowl holder and to discharge the temperature control medium from the grinding bowl holder and, if necessary, to dispose of the temperature control medium.

The heat transfer element can be connected to at least two temperature control lines for supplying the temperature control medium to the heat transfer element and for discharging the temperature control medium from the heat transfer element. In this case, a media guide that is closed to the environment is preferably provided via the temperature control lines and the media channel in the heat transfer element.

It is expedient if the temperature control is carried out by heat transfer between the temperature control medium and the grinding bowl via contact surfaces of the heat transfer element and the grinding bowl that are preferably in direct contact with each other. Preferably, the heat transfer takes place via metallic contact surfaces. This ensures good heat transfer. The contact surfaces can be ground or finely milled and have a low roughness to improve the heat transfer. It is not excluded that a heat transfer medium, for example a heat conducting paste, a heat conducting pad or a metallic foil, is arranged between the heat transfer element and the grinding bowl to improve the heat transfer.

A particularly preferred embodiment is one in which the heat transfer element and the grinding bowl are in contact with each other over essentially the entire surface in the area of the contact surfaces. This is also done for the purpose of improving the heat transfer between the heat transfer element and the grinding bowl.

The heat transfer between the heat transfer element and the grinding bowl can take place essentially exclusively by heat conduction via the contact surfaces of the heat transfer element and the grinding bowl. Nevertheless, an embodiment can be realized in which a liquid heat transfer medium, such as a thermal oil, is arranged between the heat transfer element and the grinding bowl, so that convective heat transfer between the heat transfer element and the grinding bowl is not excluded in principle.

A structurally simple embodiment of the invention provides a heat transfer element in the form of a preferably flat temperature control plate, wherein, preferably, the grinding bowl can be placed on the temperature control plate and/or can be placed laterally against the temperature control plate when fastened to the grinding bowl holder, further preferably with a bottom or side surface of the grinding bowl. The heat transfer element thus fulfils a dual function. On the one hand, it serves to transfer heat. On the other hand, the temperature control plate ensures a stable and stationary arrangement of the grinding bowl in and/or on the grinding bowl holder.

To ensure good heat transfer between the grinding bowl holder and the grinding bowl, the grinding bowl holder can be designed to brace the grinding bowl against the heat transfer element. Preferably, there is a forced bracing of the grinding bowl against the heat transfer element when the grinding bowl is braced in and/or on the grinding bowl holder. The grinding bowl can be moved in a first clamping direction during clamping in and/or on the grinding bowl holder, whereby movement of the grinding bowl in the first clamping direction can automatically result in movement of the grinding bowl in the second clamping direction and clamping of the grinding bowl against the heat transfer element by force deflection. For this purpose, the grinding bowl holder can have appropriately designed projections or geometries that act against the grinding bowl when the grinding bowl is clamped and move it in the second clamping direction. The first clamping direction and the second clamping direction can run orthogonally to each other, whereby, for example, the grinding bowl is moved in the horizontal direction when it is clamped in and/or on the grinding bowl holder and is automatically moved in the vertical direction by force deflection in order to move the grinding bowl against the heat transfer element until the grinding bowl rests against the heat transfer element and is clamped.

The heat transfer element can be formed by two preferably flat plate-shaped wall parts that are permanently and firmly connected to each other, in particular welded together, with the media channel being formed between the connected wall parts. The media channel can be formed by milled flow channels in one wall part, whereby the other wall part then only serves to cover the flow channels. In principle, the heat transfer element can also have holes as media channels machined into a one-piece block of material or a material plate. It is also possible to manufacture the heat transfer element by 3D printing.

According to an alternative embodiment, the invention also relates to a laboratory vibrating mill with at least one vibratingly mounted grinding bowl holder for at least one grinding bowl and a temperature control process for grinding bowls in vibrating mills.

To solve the task mentioned at the beginning, in this alternative embodiment a measuring, control and/or regulating device is provided for the preferably automatic control and/or regulation of the temperature of the grinding bowl holder and/or the grinding bowl and/or for the control and/or regulation of the temperature in a grinding chamber of the grinding bowl. Further preferably, closed-loop control can be enabled. The temperature measurement is preferably carried out in the immediate vicinity of the grinding bowl with at least one temperature sensor. The control by the local proximity of at least one temperature sensor to the grinding vessel has a lower control inertia, so that precision and speed of the control increase. Particularly preferably, temperatures can be controlled by means of a PID controller. In this context, at least one temperature measuring element, in particular a temperature sensor, arranged on the grinding bowl holder and/or in and/or on the grinding bowl and/or on and/or in a temperature control line for a temperature control medium is provided. The temperature sensor can also be mounted in the grinding chamber to enable in situ temperature monitoring of the grinding sample. Thus, the temperature sensor enables temperature monitoring of the grinding vessel. The determined temperature can be used as input for a process controller.

The temperature control, i.e. the cooling and/or heating, of the grinding bowl can be carried out, as described above, with a temperature control device by supplying and/or discharging a liquid or gaseous temperature control medium, in particular liquid nitrogen, via the temperature control line to the grinding bowl holder and/or also directly to the grinding bowl. The temperature can be controlled and/or regulated in particular by changing the volume flow of the temperature control medium supplied to the grinding bowl holder and/or the grinding bowl as a function of a measuring temperature and/or by changing directly the temperature of the temperature control medium by corresponding pre-cooling or preheating of the temperature control medium. This aspect of the invention makes it possible for the first time in the prior art to adapt the amounts of energy transferred during temperature control to the actual demand, i.e. to adapt the cooling or heating of the temperature control medium to the specific amounts of heat released during the grinding of a sample or required in connection with the grinding of the sample. Particularly preferably, a temperature control and/or temperature regulation system is provided which permits infinitely variable adjustment and/or regulation of the temperature of the grinding bowl holder and/or the grinding bowl.

The temperature control can be carried out by a preferably clocked supply of liquid nitrogen, whereby a nitrogen flow is led to the grinding bowl holder and/or to the grinding bowl and is returned from there via a return line into a collecting vessel. A temperature sensor can be provided on and/or in the collecting vessel in order to detect the level of liquid nitrogen in the collecting vessel by means of temperature measurement. If nitrogen is detected, a switching valve in the supply line can be closed. After so much nitrogen has evaporated that the temperature sensor shows a clear drop in temperature and/or no longer comes into contact with nitrogen, the switching valve can be opened again to supply nitrogen again via the feed line to the grinding bowl holder and/or the grinding bowl. The nitrogen detection is thus carried out via temperature detection. However, it is not excluded that a sensor is also provided that closes the switching valve when it comes into contact with liquid nitrogen.

For temperature control of the grinding bowl holder and/or the grinding bowl, according to the invention, a temperature is measured and controlled and/or regulated at the grinding bowl holder and/or in and/or at the grinding bowl and/or at and/or in a temperature control line for the temperature control medium.

In a laboratory vibrating mill with the features mentioned at the beginning, wherein the grinding bowl holder has a heat transfer element connected to the temperature control line, at least one temperature sensor can be expediently arranged on and/or in the heat transfer element. Preferably, the temperature sensor engages in a media channel formed in the heat transfer element and, during temperature measurement, the temperature control medium guided in the media channel flows around it. By measuring the temperature of the temperature control medium inside the heat transfer element, a specific setpoint temperature can be set or adjusted with high accuracy. The temperature sensor enables temperature monitoring of the grinding bowl holder and thus also of the grinding bowl. In principle, however, temperature detection can also be carried out directly on the grinding bowl and/or in a grinding chamber of the grinding bowl. This enables direct temperature monitoring of a sample located in the grinding chamber.

The measured temperatures can be used as input values for a process controller of a measuring, control and regulation system. Due to the local proximity of the temperature measurement to the grinding vessel, a lower control inertia can be achieved in the temperature control, so that the precision and speed of the control increases.

In a laboratory mill that has several grinding bowl holders, the measuring, control and/or regulating device can be designed to control and/or regulate the temperatures at the grinding bowl holders and/or in and/or on the grinding bowls independently of one another. In this way, the temperatures in the grinding bowls can be controlled independently of each other and the amount of heat to be removed from the respective grinding bowl or the amount of heat to be supplied to the respective grinding bowl can be adapted even more precisely to the actual heat requirement.

BRIEF DESCRIPTION OF THE DRAWINGS

The drawing shows examples of embodiments of the invention, which are described below. They show.

DETAILED DESCRIPTION

Figure 1:
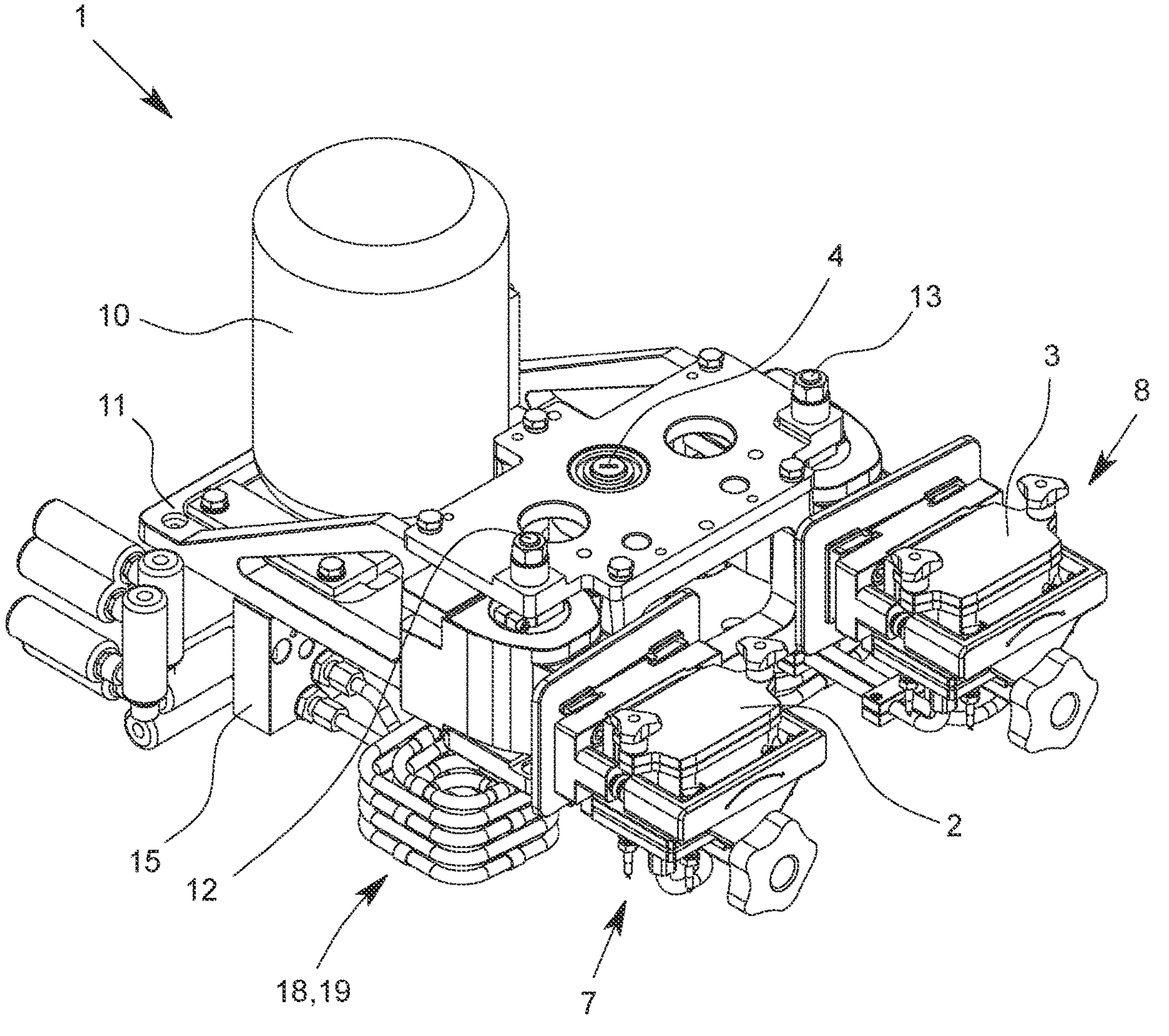
FIG. 1 is a perspective view of a laboratory vibrating mill according to the invention.

FIG. 1 shows a top view of a vibrating mill 1 for two grinding bowls 2, 3 performing circular arc-shaped vibrations in a horizontal position. A pendulum drive of the vibrating mill 1 is constructed in several parts with an eccentric shaft 4 mounted to rotate about a vertical eccentric axis and with two swinging arms 5, 6 each mounted to swing about vertical swinging axes and connected to the eccentric shaft 4 via couplings. Grinding bowl holders 7, 8 for the grinding bowls 2, 3 are attached to the swinging arms 5, 6. Furthermore, a motor unit 10 coupled to the eccentric shaft 4 via a V-belt 9 is provided for torque transmission. The eccentric shaft 4 is rotatably mounted on a base plate 11. Furthermore, two bearing bolts 12, 13 are attached to the base plate 11, around which the swing arms 5, 6 are rotatably mounted. Finally, the motor unit 10 is arranged on the base plate 11. The eccentric shaft 4, the bearing bolts 12, 13 and the motor unit 10 thus form, together with the base plate 11, a constructional unit which can stand on a floor or ground via damping elements.

The motor unit 10 transmits a torque to the eccentric shaft 4 via the V-belt 9. A rotary movement of the eccentric shaft 4 is converted via the couplings into an oscillating movement of the oscillators 5, 6. The oscillation frequency can be between 3 and 50 Hz, preferably up to 35 Hz. The oscillation path (double amplitude deflection) of the grinding bowl can be between 20 and 50 mm, preferably between 20 and 30 mm.

Temperature control, i.e. cooling or heating, of the grinding bowls 2, 3 is possible via a temperature control device not shown in detail. To transport a temperature control medium, which can be liquid or gaseous, from a stationary part 14, 15 of the vibrating mill 1 to a grinding bowl holder 7, 8 and to discharge the medium from the respective grinding bowl holder 7, 8 to the stationary part 14, 15, each grinding bowl holder 7, 8 is connected to two temperature control lines 16, 17. One of the two temperature control lines 16, 17 is provided for the supply, the other of the two temperature control lines 16, 17 for the discharge of a gas or liquid temperature control medium, in particular liquid nitrogen, to the respective grinding bowl holder 7, 8.

The temperature control lines 16, 17 are preferably designed as continuous uninterrupted pipelines. The temperature control lines 16, 17 can, for example, be made of stainless steel or plastic or have stainless steel and/or plastic.

The structure of the cable routing is the same for both grinding bowl holders 7, 8, so that only one cable routing is described below as an example. In this case, the line arrangement with the temperature control lines 16, 17 of a grinding bowl holder 7 is designed mirror-symmetrically to the line routing of the second grinding bowl holder 8.

To compensate for relative movements that occur between a grinding bowl holder 7, 8 and the stationary part 14, 15 assigned via the temperature control lines 16, 17 during operation of the vibrating mill 1, each line 16, 17 has a compensating element 18, 19. Each line 16, 17 is designed as a rigid pipeline over its entire length, with the compensating element 18, 19 being formed by a pipeline section of the line 16, 17.

During operation of the vibrating mill 1, the relative movements cause an oscillating deformation of the pipe sections forming the compensating elements 18, 19, whereby the pipe sections of the respective pipe 16, 17 adjacent to the compensating elements 18, 19 are comparatively less deformed. The design of the compensating elements 18, 19 as rigid pipeline sections enables the compensation of relative movements without having to use pipeline parts that are connected to each other so that they can rotate and/or swivel relative to each other. In particular, it is not necessary to use the rotary unions known from the prior art to compensate for relative movements, so that a hermetically sealed, uninterrupted connection and a permanently leak-free transport of the temperature control medium between the grinding bowl holders 7, 8 and the stationary parts 14, 15 is guaranteed in a simple manner. In particular, it is not necessary to use sealing elements to compensate for relative movements, as is the case with rotary unions.

For the connection of the temperature control lines 16, 17 to the grinding bowl holders 7, 8 on the one hand and for the connection to the stationary parts 14, 15 on the other hand, connection and accessory parts of the assembly technology known per se from the state of the art can be provided. The connection of the temperature control lines as such, i.e. decoupled from the compensation of relative movements, can be made via sealing means in order to enable a sealing connection between the respective line 16, 17 and the grinding bowl holder 7, 8 on the one hand and the stationary part 14, 15 on the other hand.

Figure 3:
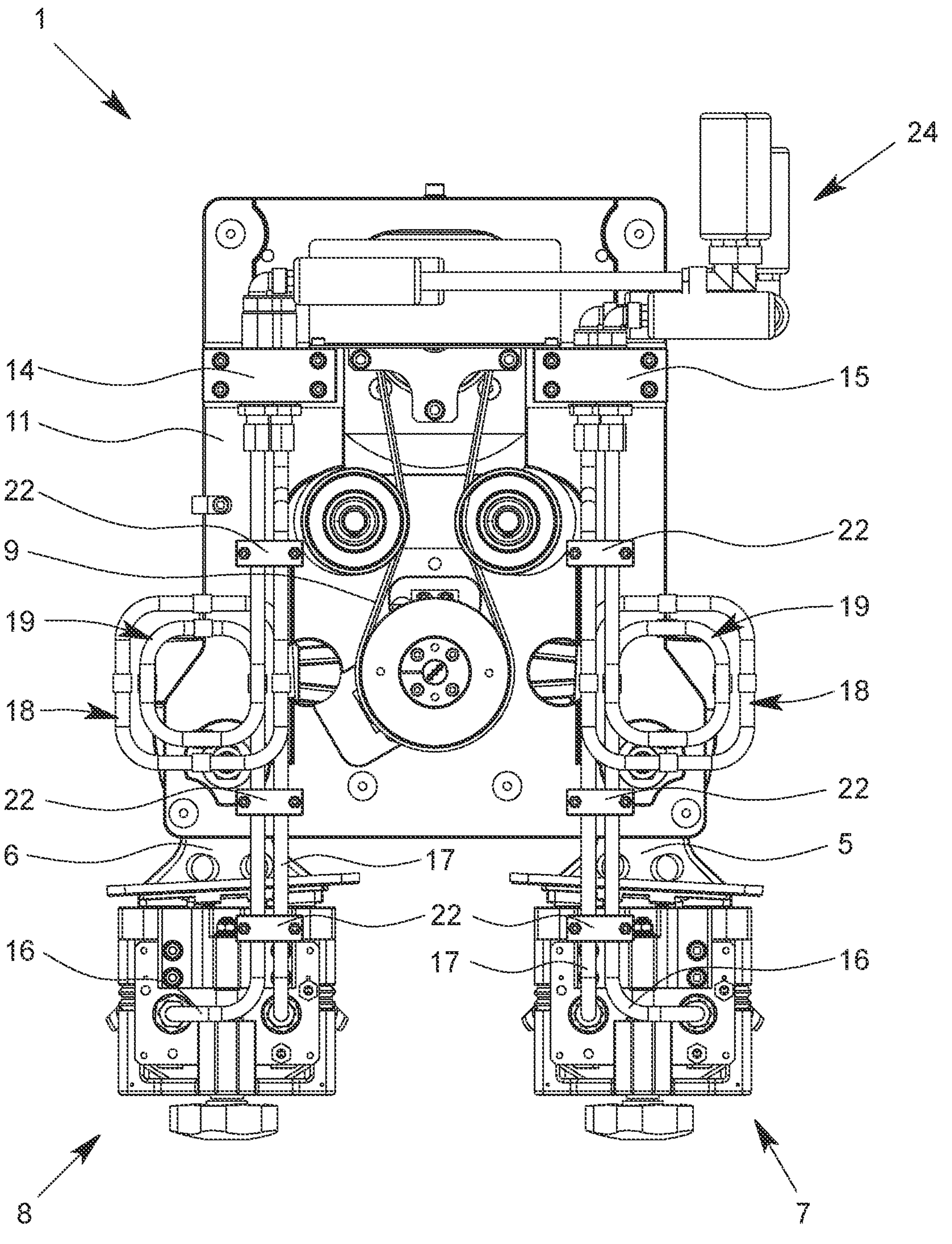
FIG. 3 is a view of the laboratory mill from FIG. 1 from below.
Figure 4:
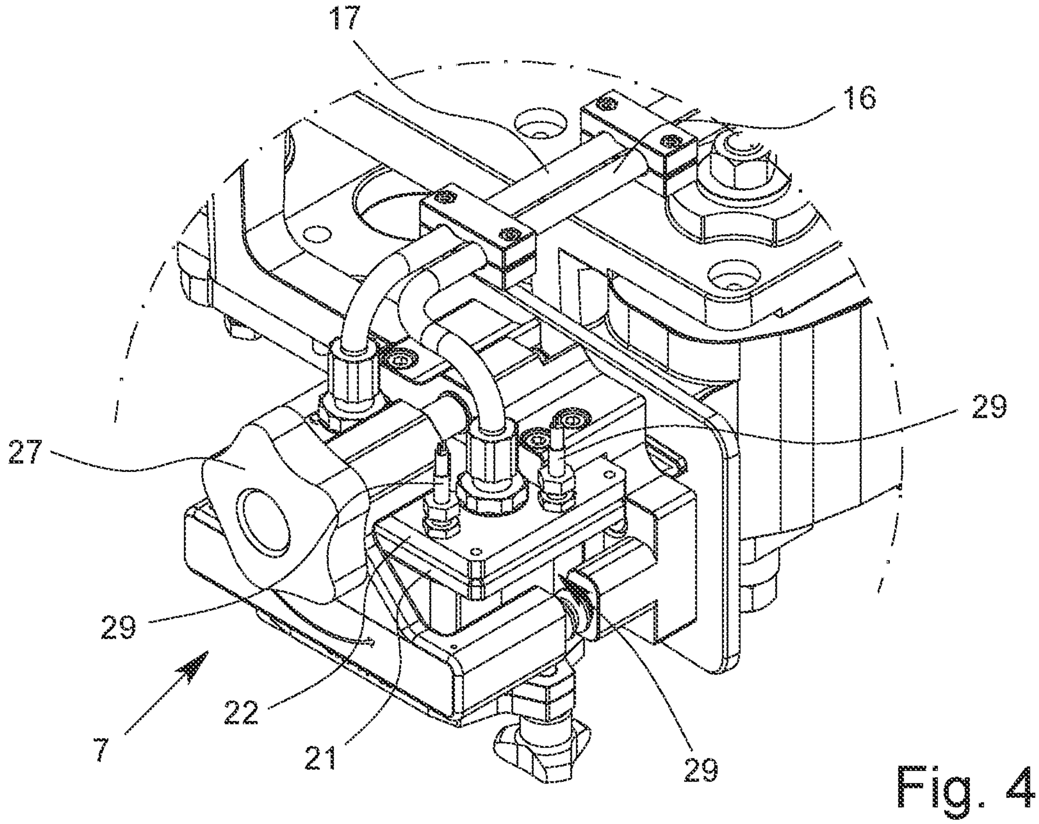
FIG. 4 is an enlarged partial view of the right grinding bowl holder of the laboratory vibrating mill shown in FIG. 3.
Figure 5:
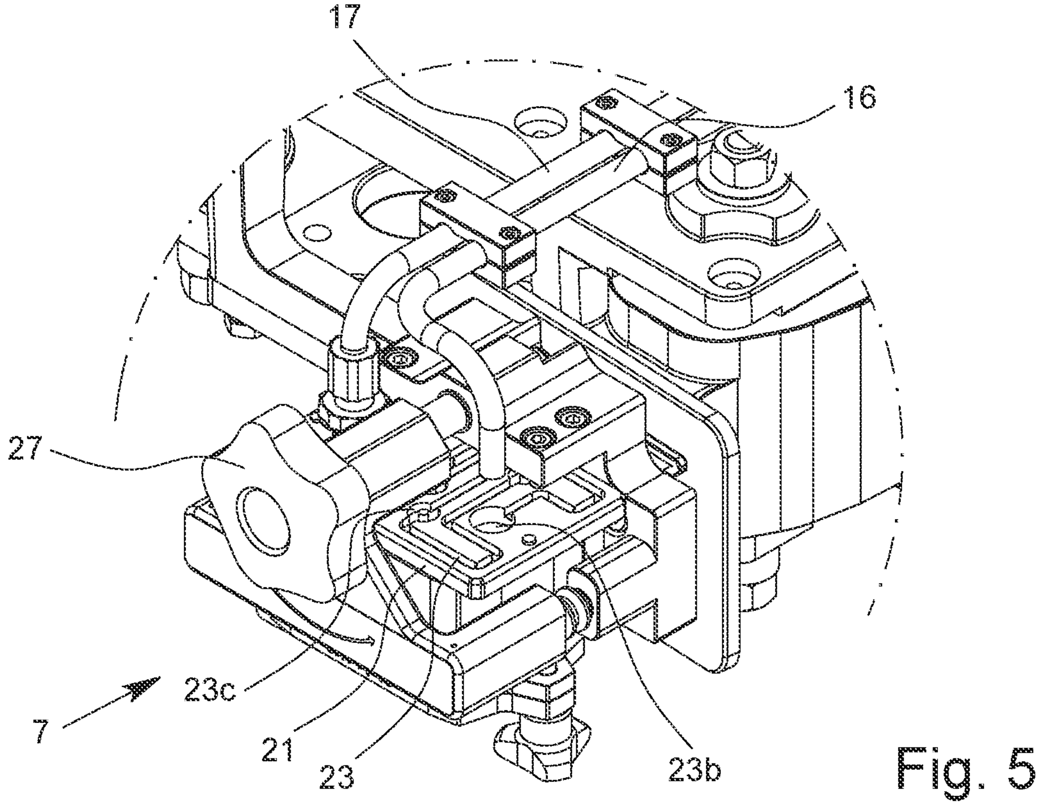
FIG. 5 is the perspective view of the grinding bowl holder from FIG. 4, wherein the grinding bowl holder has a two-part plate-shaped heat transfer element and an external part of the heat transfer element is hidden on the connection side of the heat transfer element.
Figure 6:
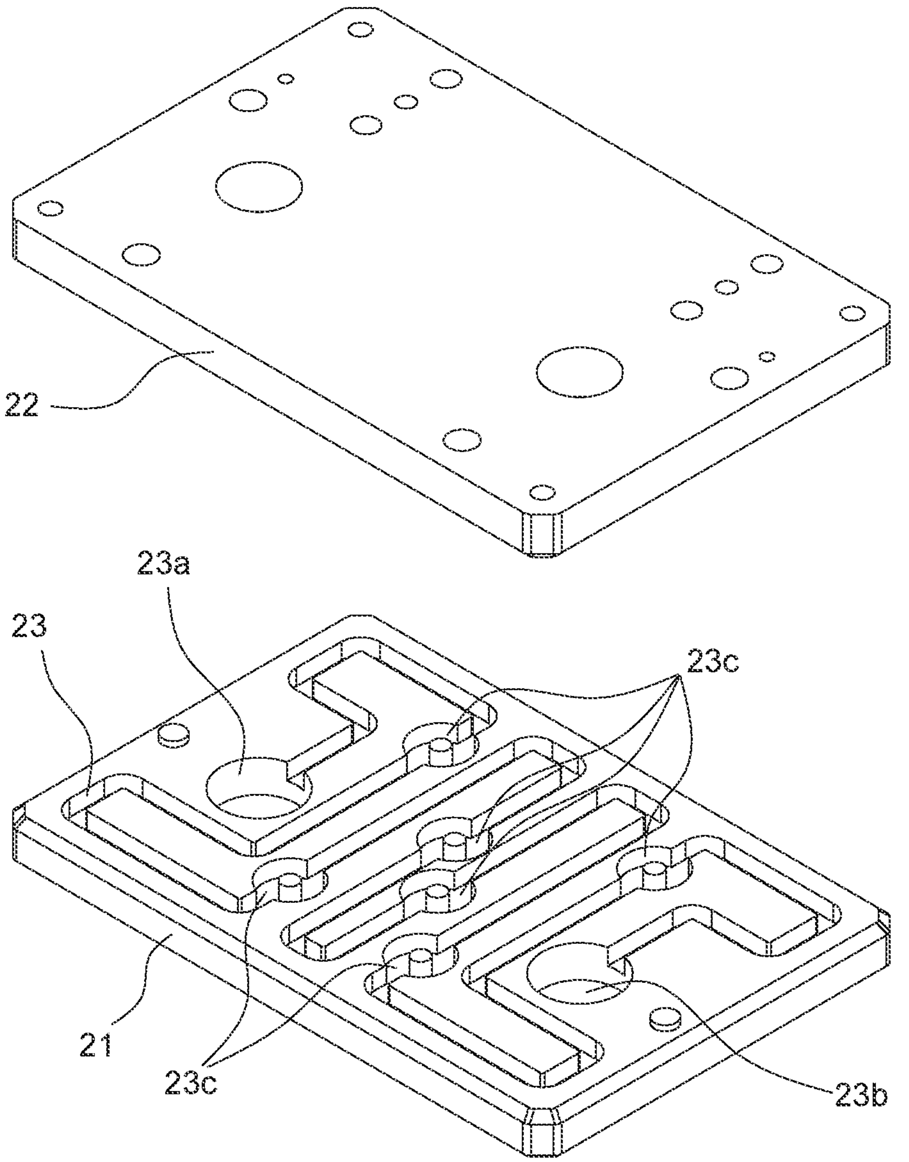
FIG. 6 is a single perspective view of the two-part heat transfer element of the grinding bowl holders shown enlarged in FIGS. 4 and 5.

In FIGS. 4 and 5 the grinding bowl holder 7 is shown enlarged in the view according to FIG. 3. It is not shown that a temperature control device is provided for controlling the temperature of the grinding bowl 2 by supplying and/or discharging a liquid or gaseous temperature control medium via the temperature control lines 16, 17 to the grinding bowl holder 7, 8. In the simplest case, the temperature control device has a conveying means for the temperature control medium and a container for holding a temperature control medium. A closed circuit of the temperature control medium via the temperature control line 16, 17 is also preferably provided.

Each grinding bowl holder 7, 8 has a heat transfer element 20 connected to the temperature control lines 16, 17, which in the embodiment shown is plate-shaped and has an inner first plate part 21 and an outer second plate part 22 on the connection side of the heat transfer element 20. The temperature control lines 16, 17 are connected on the outside of the outer plate part 22 to the plate part 22 by means of connecting elements known per se from the prior art.

FIG. 5 shows the grinding bowl holder 7 from FIG. 4, with the outer plate part 22 hidden. This allows a clear view of the inner plate part 21, in which a media channel 23 is formed for the temperature control medium to flow through. By joining the plate parts 21, 22, which can be done by welding or gluing, the media channel 23 is hermetically sealed from the environment. It is also possible to screw the plate parts 21, 22 together.

During the temperature control of a grinding bowl 2, 3, i.e. during the passage of a cold or warm or hot temperature control medium through the temperature control lines 16, 17, heat is transferred between the temperature control medium guided in the medium channel 23 and the grinding bowl 2 via a wall of the heat transfer element 20, in the present case via the inner plate part 21. By guiding the temperature control medium in the medium channel 23, temperature control of the grinding bowl 2, 3 is possible in which the latter does not come into contact with the temperature control medium or in which any contact and thus the risk of contamination of the grinding bowl 2, 3 with the temperature control medium is excluded. The media channel 23 is meander-shaped and opens into two blind holes 23*a*, 23*b*. In addition, ring milled holes 23*c* are provided to improve heat transfer.

Figure 2:
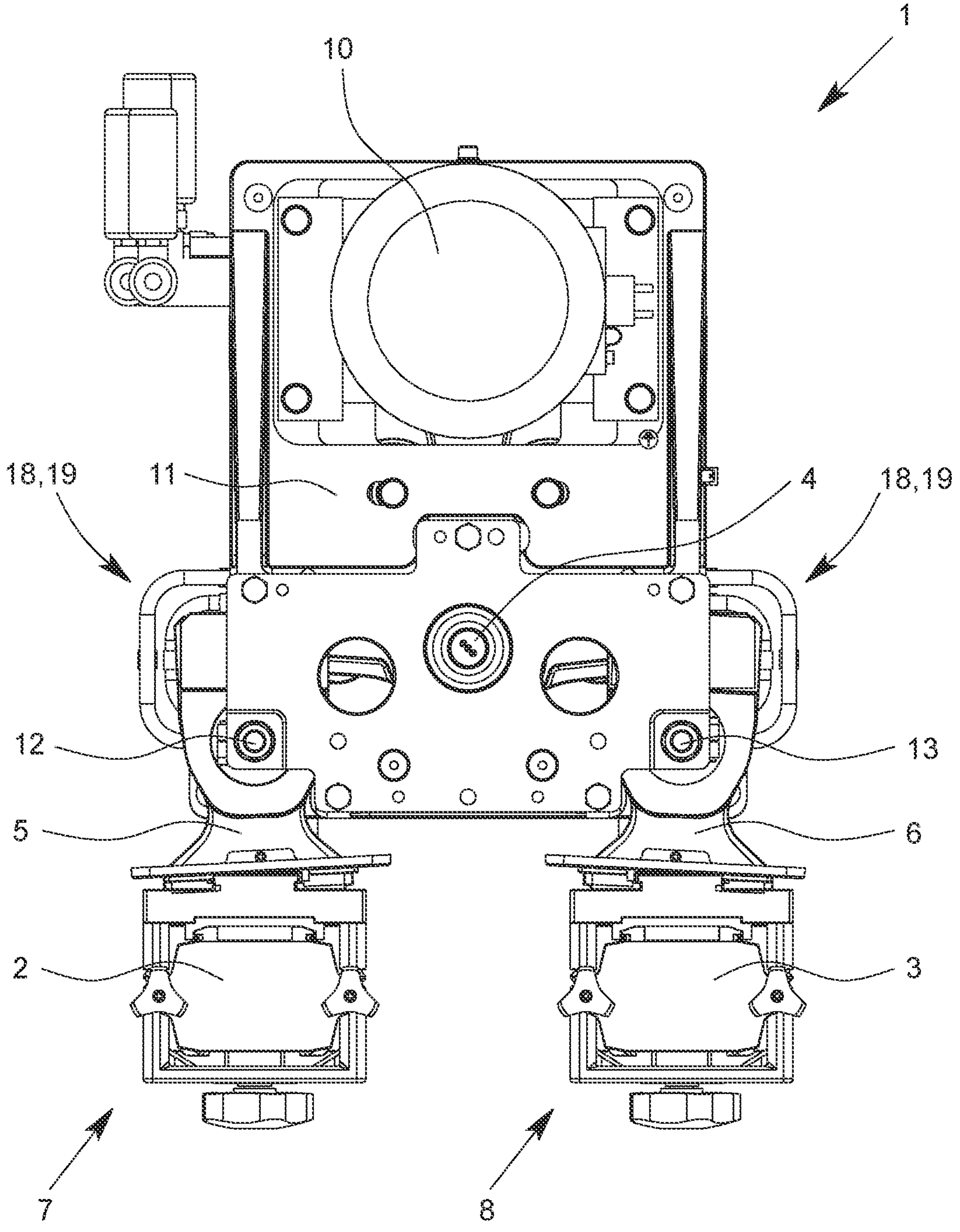
FIG. 2 is a top view of the laboratory mill from FIG. 1.
Figure 7:
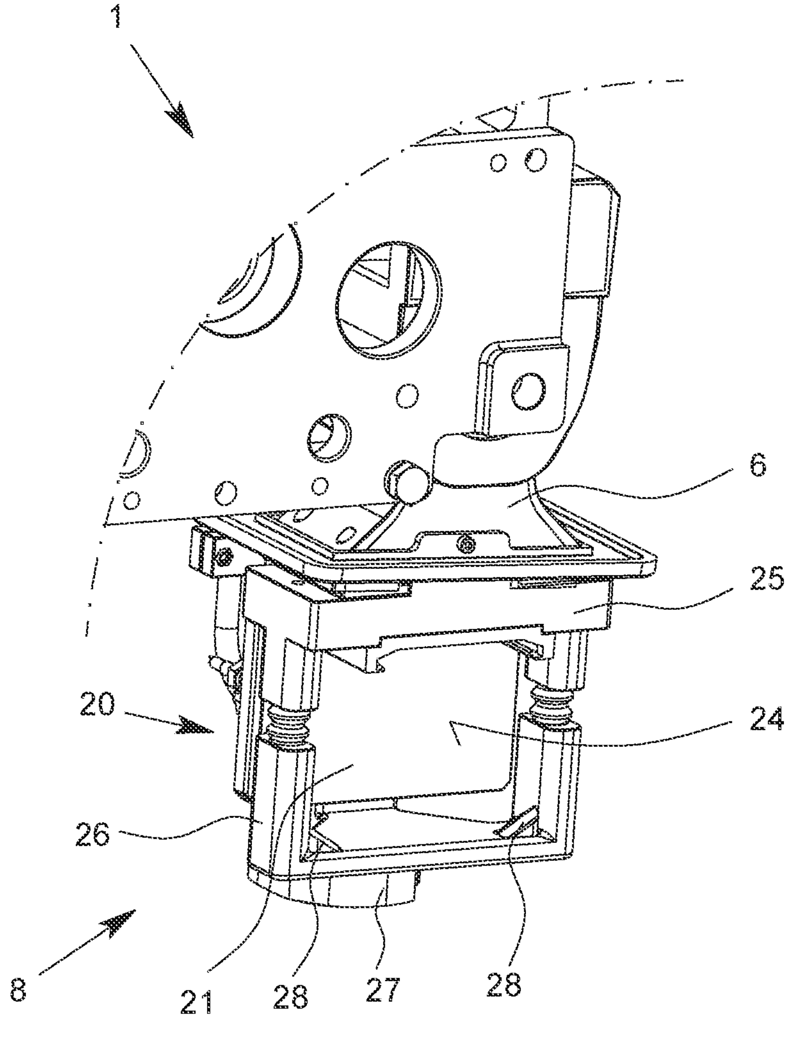
FIG. 7 is a perspective view of the grinding bowl holder shown in FIG. 2 on the right in a top view, before inserting a grinding bowl into the grinding bowl holder.

The heat transfer between the temperature control medium and the grinding bowl 2, 3 takes place via metallic contact surfaces of the heat transfer element 10 and the grinding bowl 2 that lie against each other, whereby in FIG. 7 the grinding bowl holder 8 from FIG. 2 is shown after the grinding bowl 3 has been removed. As can be seen from FIG. 7, a flat contact surface 24 is provided on the upper side or the outer side of the plate part 21 facing the grinding bowl 2, which contact surface rests against an outer bottom surface of the grinding bowl 2 over substantially the entire area during the grinding process. In the embodiment shown, heat is transferred between the heat transfer element 20 and the grinding bowl 2 exclusively by heat conduction via the contact surface 24 of the plate part 21 and the bottom surface of the grinding bowl 2.

The grinding bowl holder 7, 8 of the laboratory mill 1 shown has in each case a holding bracket 25 firmly connected to a rocker 5, 6, which cooperates with a horizontally adjustable further holding bracket 26. By adjusting the clamping screw 27, the outer retaining bracket 26 can be clamped against the inner retaining bracket 25 and thus a grinding bowl 2, 3 can be clamped horizontally between the retaining brackets 25, 26.

Clamping pieces 28 arranged in the corner areas are provided on the outer retaining bracket 26, which, when the grinding bowl 2, 3 is clamped horizontally in the grinding bowl holder 7, 8, cause the grinding bowl 2, 3 to be automatically pressed downwards against the inner plate part 21 of the heat transfer element 20 by force deflection. For this purpose, the clamping pieces 28 can be chamfered on the inner side facing the plate part 21 or have a corresponding clamping slope.

In the immediate vicinity of the grinding bowl, namely on each heat transfer element 20, there are preferably two temperature sensors 29 for measuring temperature on the heat transfer element 20. The temperature sensors 29 are connected via electrical lines not shown to an evaluation unit of a measuring, control and/or regulating device not shown for automatically regulating the temperature of the grinding bowl holder 6, 7. The temperature sensors 29 can be provided here for measuring the temperature of a plate part 21, 22 and/or can also engage into the area of the medium channel 23 via holes in the outer plate part 22 of the heat transfer element 20, so that a measuring sensor of the respective temperature sensor 29 engages in the temperature control medium guided in the interior of the medium channel 23 or is flushed around by the temperature control medium. This makes it possible to also directly measure the temperature of the temperature control medium in the area of the grinding bowl holder 6, 7. Due to the arrangement of the temperature sensors 29 in local proximity to the grinding bowl 2, 3, a temperature control of the temperatures at and/or in the grinding bowls 2, 3 is possible with low control inertia, so that a high precision and high speed of the temperature control can be achieved.

In a non-shown embodiment of a vibrating mill 1, a temperature sensor 29 is provided for each heat transfer element 20. The temperature sensors 29 are connected via electrical lines, which are not shown, to an evaluation unit of a measuring and/or control device 30, which is not shown, for automatic control of the temperature of the grinding bowl holder 6, 7.

Figure 8:
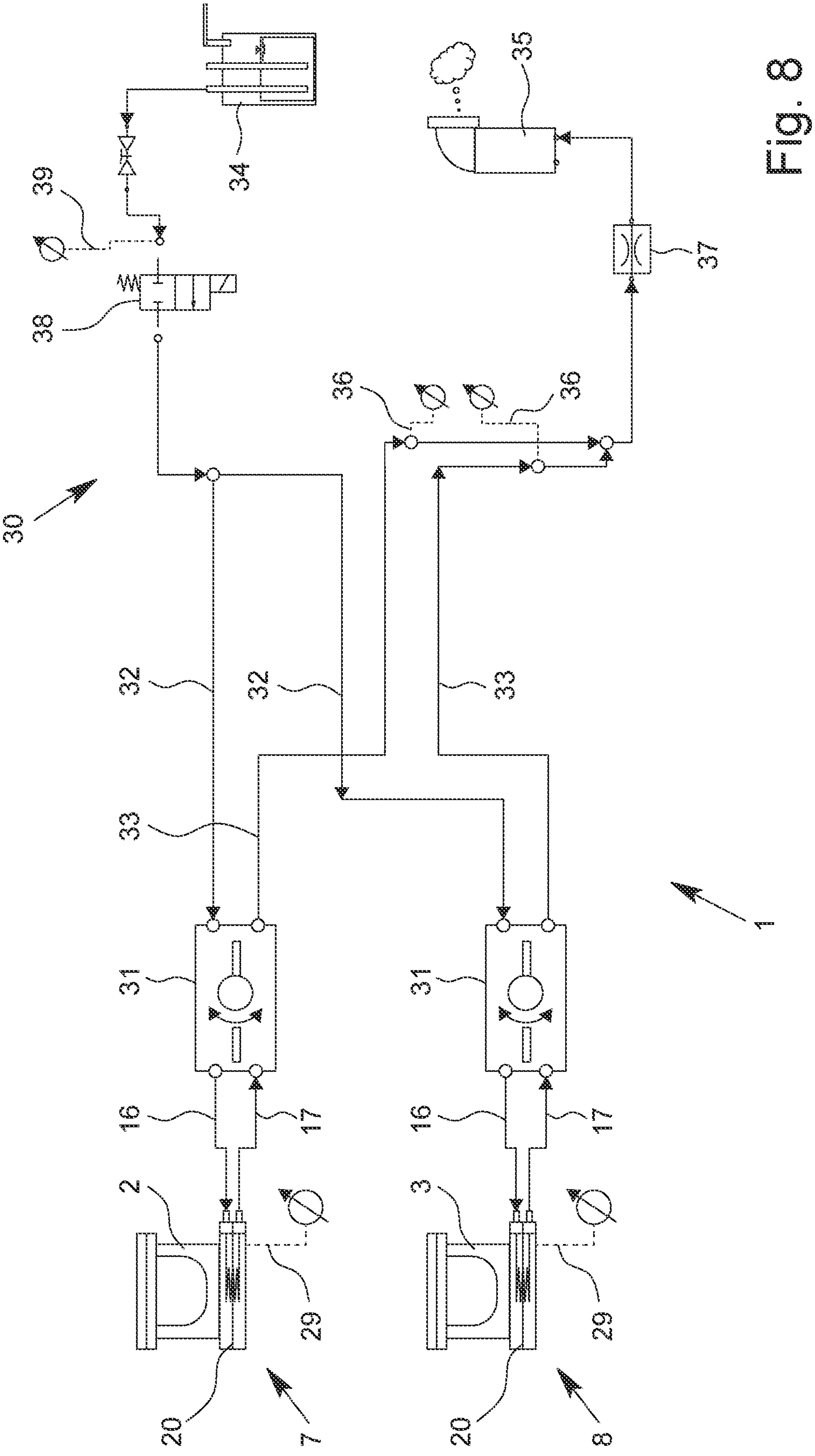
FIG. 8 is a schematic process diagram of a first embodiment of a process according to the invention for temperature control of grinding bowls in a vibrating mill.
Figure 9:
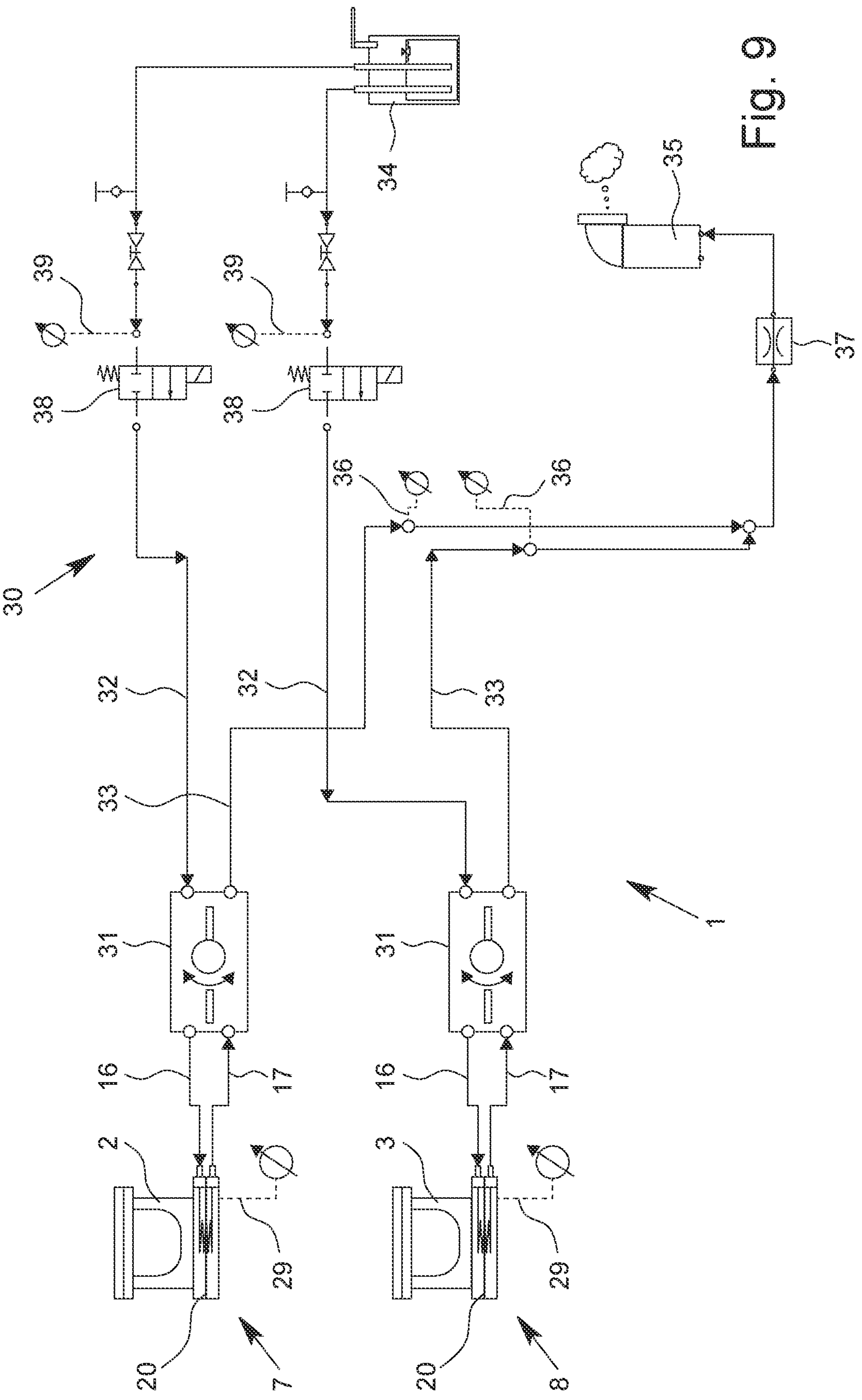
FIG. 9 is a schematic process diagram of an alternative embodiment of a process for temperature control of the grinding bowls in a vibrating mill.

FIGS. 8 and 9 schematically show two alternative methods for controlling the temperature of two grinding bowls 2, 3 of a laboratory vibrating mill 1, which is not shown in detail. A measuring, control and/or regulating device 30 is provided for automatically regulating the temperature of two grinding bowl holders 7, 8 of the vibrating mill 1. The temperature control is carried out with the aid of at least two temperature sensors 29, with which the temperatures of two heat transfer elements 20 of the grinding bowl holders 7, 8 are determined during the operation of the vibrating mill 1 or during a grinding process. During the grinding process, the grinding bowls 2, 3 stand on the heat transfer element 20. The heat transfer preferably takes place exclusively by heat conduction via contacting surfaces.

For the supply and discharge of a liquid or gaseous temperature control medium, in the embodiment examples of liquid nitrogen, to the heat transfer elements 20 or to the respective grinding bowl holder 7, 8, each grinding bowl holder 7, 8 is connected to two temperature control lines 16, 17. The temperature control lines 16, 17 of a grinding bowl holder 7, 8 are connected to a rotary feedthrough 31 to enable the compensation of relative movements between the vibrating grinding bowl 2, 3 and a stationary part of the laboratory mill 1.

Each rotary union 31 is connected to a supply line 32 and to a discharge line 33 for supplying the temperature control medium from a medium container 34, for example a nitrogen tank, or for discharging the temperature control medium after it has flowed through the heat exchanger element 20 into a disposal device for the temperature control medium, in the present case a pressure relief pipe 35. Further temperature sensors 36 are provided for measuring the temperature of the medium in the discharge pipes 33. The further temperature sensors 36 serve in particular for error handling. With a measured value associated with each discharge line 33, leakage can be concluded for each discharge line 33 and associated heat transfer element 20 as well as the associated lines 32 and rotary unions 31. In this way, proper operation can be efficiently monitored via measured values without having to physically check the lines. Finally, the lines are routed to the expansion pipe 35 via a choke 37.

In a not shown and preferred embodiment, it is intended to combine the discharge lines 33 in order to lead them via a throttle 37 to the expansion pipe 35. In this embodiment, a temperature measurement with at least one sensor 36 is provided after the merging.

The supply of the temperature control medium from the medium container 34 via the supply lines 32 to the respective rotary union 31 is effected with a solenoid valve 38 as an actuator of a closed control loop depending on the temperatures determined at the grinding bowl holders 7, 8 via the temperature sensors 29. The solenoid valve 38 is thus provided to effect the clocked addition or feeding of the temperature control medium into the supply lines 32 to the two grinding bowl holders 7, 8. The medium supply temperature can be determined by means of a further temperature sensor 39.

Furthermore, the measuring, control and/or regulating device 30 has an evaluation or computer unit, which is not shown, with which a comparison of the measured temperatures with predefined setpoint values is carried out, whereby the actuator of the control circuit is subsequently actuated on the basis of the setpoint/actual value comparison. In the embodiment example shown, the timing of the solenoid valve 38 is changed accordingly depending on the setpoint/actual value comparison.

It is understood that the process sequence described in FIG. 8 for temperature control of the grinding bowls 2, 3 via the temperature control of the grinding bowl holders 7, 8 can also be provided in a corresponding manner when using other temperature control media. In addition, the control method described also allows the temperature of the grinding bowls 2, 3 to be determined and controlled directly. For this purpose, temperature sensors can be arranged on and/or in the grinding bowls 2, 3.

The data transmission between the sensors and an evaluation device of the measuring, control and/or regulating device can take place wired or wirelessly, for example via radio.

FIG. 9 schematically shows the process sequence for an alternative method of temperature control of the grinding bowls 2, 3. In contrast to the process sequence shown in FIG. 8 and described above, two solenoid valves 38 are provided according to FIG. 9 in order to adjust the timing of the respective solenoid valve 38 depending on the temperature measured at the respective grinding bowl holder 7, 8. This makes it possible to cool or heat the grinding bowls 2, 3 to different degrees and to control the temperatures in and/or on the grinding bowls independently of each other.

LIST OF REFERENCE SIGNS

1 Vibrating Mill
2 Grinding bowl
3 Grinding bowl
4 Eccentric shaft
5 Swing arm
6 Swing arm
7 Grinding bowl holder

8 Grinding bowl holder
9 V-belt
10 Motor unit
11 Base plate
12 Bearing bolt
13 Bearing bolt
14 stationary part
15 stationary part
16 Temperature control line
17 Temperature control line
18 Compensating element
19 Compensating element
20 Heat transfer element
21 Plate part
22 Plate part
23 Media channel
23*a* Blind hole
23*b* Blind hole
23*c* Ring milling
24 Contact surface
25 Retaining bracket
26 Retaining bracket
27 Clamping screw
28 Clamping piece
29 Sensor
30 Measuring, control and/or regulating device
31 Rotary union
32 Feed line
33 Derivation
34 Media container
35 Expansion tube
36 Sensor
37 Choke
38 Solenoid valve
39 Sensor

The invention claimed is:

1. A laboratory oscillation mill comprising:

a swingingly mounted grinding bowl holder for a grinding bowl; and a temperature control device for a temperature control of the grinding bowl by supplying and/or discharging a liquid or gaseous temperature control medium via a temperature control line to the grinding bowl holder;

wherein the grinding bowl holder has a heat transfer element connected to the temperature control line;

wherein the heat transfer element has a medium channel for passing through the temperature control medium;

wherein the temperature control of the grinding bowl held by the grinding bowl holder is effected by a heat transfer between the temperature control medium guided in the medium channel and the grinding bowl via a wall of the heat transfer element;

wherein the heat transfer element is designed as a flat temperature control plate, so that the grinding bowl can be placed with a bottom surface on the temperature control plate; and wherein the grinding bowl holder is designed for the temperature control of the grinding bowl without contact with the temperature control medium.

2. The laboratory oscillation mill according to claim 1, wherein the temperature control is affected by the heat transfer between the temperature control medium and the grinding bowl via contact surfaces of the heat transfer element and the grinding bowl, which lie directly against one another.

3. The laboratory oscillation mill according to claim 2, wherein the heat transfer element and the grinding bowl bear against one another over substantially an entirety of the contact surfaces of the heat transfer element and the grinding bowl.

4. The laboratory oscillation mill according to claim 2, wherein the heat transfer between the heat transfer element and the grinding bowl takes place substantially exclusively by heat conduction via the contact surfaces of the heat transfer element and the grinding bowl.

5. The laboratory oscillation mill according to claim 1, wherein the grinding bowl holder is designed to brace the grinding bowl against the heat transfer element.

6. The laboratory oscillation mill according to claim 1, wherein a measuring, control and/or regulating device is provided for automatically controlling and/or regulating a temperature of the grinding bowl holder and/or a temperature of the grinding bowl and/or a temperature in a grinding chamber of the grinding bowl.

7. The laboratory oscillation mill according to claim 1, wherein the swingingly mounted grinding bowl holder is a first grinding bowl holder and the grinding bowl is a first grinding bowl;

wherein a second swingingly mounted grinding bowl holder for a second grinding bowl is provided; and wherein a measuring, control and/or regulating device is provided for controlling and/or regulating temperatures at the first and second grinding bowl holders and/or in the first and second grinding bowls independently of one another.

8. A method for the temperature control of the grinding bowl during a grinding process in the laboratory oscillation mill according to claim 1, wherein a temperature at the grinding bowl holder and/or a temperature in the grinding bowl and/or a temperature in the temperature control line for the temperature control medium for a temperature control of the grinding bowl holder and/or the temperature control of the grinding bowl is measured and controlled and/or regulated.

* * * * *